United States Patent Office 3,294,744
Patented Dec. 27, 1966

3,294,744
THERMOSETTING POLYMERS PRODUCED FROM 6 - HYDROXYTETRAHYDROPYRAN-2-CARBOX-YLIC ACID LACTONE AND PROCESS OF PREPARING SAME
Julius J. Brezinski, St. Albans, W. Va., Donald G. Kubler, Greenville, S.C., and Julian K. Rose, South Charleston, W. Va., assignors to Union Carbide Corporation, a corporation of New York
No Drawing. Filed Jan. 8, 1962, Ser. No. 165,031
20 Claims. (Cl. 260—47)

This invention relates to thermosetting, condensation polymers and to a method for their preparation. More specifically, this invention relates to thermosetting condensation polymers produced by the reaction of 6-hydroxytetrahydropyran-2-carboxylic acid lactones and polyfunctional organic compounds containing at least two reactive hydrogen atoms per molecule, and to thermoset products obtained therefrom.

The thermosetting, condensation polymers of the present invention are particularly desirable as protective coatings on wood, metal and other like surfaces as once applied to the desired surface and thermoset, as for example by heating, they provide surface coatings which are highly resistant to the softening and/or swelling action of such chemicals as methyl ethyl ketone, dioxane, dimethylformamide and the like. In addition, the thermosetting polymers of this invention, being soluble in water, can be readily applied as coatings from aqueous solutions thereby eliminating the use of volatile, flammable and possibly toxic organic solvents. Furthermore, the thermosetting condensation polymers of this invention can be used as adhesives, bonding together wood surfaces to form a composite structure which is extremely resistant to delamination.

The 6-hydroxytetrahydropyran-2-carboxylic acid lactones which are reacted with polyfunctional organic compounds containing at least two reactive hydrogen atoms per molecule, to produce the thermosetting condensation polymers of the present invention have the formula:

FORMULA I

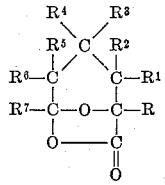

wherein R through $R^7$, which can be the same or different, are hydrogen or alkyl and when alkyl generally containing from 1 to 8 carbon atoms inclusive and preferably containing from 1 to 4 carbon atoms inclusive. Illustrative of such alkyl groups are the following: methyl, ethyl, n-propyl, isopropyl, n-butyl, isopentyl, 2-methylpentyl, 2-ethylhexyl and the like. Exemplary of specific compounds falling within the scope of Formula I are 6-hydroxytetrahydropyran-2-carboxylic acid lactone;
2,5-dimethyl-6-hydroxytetrahydropyran-2-carboxylic acid lactone;
3,6-diethyl-6-hydroxytetrahydropyran-2-carboxylic acid lactone;
2-methyl-4-propyl-6-hydroxytetrahydropyran-2-carboxylic acid lactone;
2,4,6-trimethyl-6-hydroxytetrahydropyran-2-carboxylic acid lactone;
5-n-butyl-6-hydroxytetrahydropyran-2-carboxylic acid lactone;
4-n-amyl-6-hydroxytetrahydropyran-2-carboxylic acid lactone;
3,3-dimethyl-6-ethyl-6-hydroxytetrahydropyran-2-carboxylic acid lactone, and
the like.

Compounds which are reacted with the 6-hydroxytetrahydropyran-2-carboxylic acid lactones are those polyfunctional organic compounds, having at least two reactive hydrogen atoms per molecule which are capable of opening the lactone ring. Typical among such compounds are the polyfunctional alcohols, polyfunctional amines, polyfunctional phenols and polyfunctional mercaptans.

Illustrative of suitable polyhydric alcohols are the linear and branch chain glycols which have the general formula:

$$HO(C_nH_{2n})OH$$

wherein $n$ is an integer having a value of 2 to 20 inclusive, preferably 2 to 5 inclusive, exemplary of which are ethylene glycol, 1,2-propylene glycol, 1,3-propylene glycol, 2,2-dimethyl-1,3-propanediol, 2,2-diethyl-1,3-propanediol, 1,4-butylene glycol, 3-methyl-1,5-pentanediol and the like; linear and branch chain alkylene ether glycols, which have the general formula:

$$HO(C_aH_{2a}O)_bH$$

wherein $a$ is an integer having a value of 2 to 20 inclusive, preferably 2 to 5 inclusive, and $b$ has a value of 2 to 85 inclusive, such as diethylene glycol, dipropylene glycol, poly(ethylene glycol), poly(propylene glycol) and the like; other suitable polyfunctional alcohols are the cycloaliphatic diols such as 1,4-cyclohexanediol and the like; higher polyols such as glycerol, trimethylolethane, 1,2,4-butanetriol, pentaerythritol, 1,2,6-hexanetriol, dipentaerythritol, sorbitol, glucose, sucrose, starch, cellulose and the like.

Exemplary of suitable polyfunctional amines are the primary and secondary amines, among which can be noted the following compounds: methylamine, ethylamine, diethylamine, n-propylamine, isopropylamine, n-butylamine, n-amylamine, laurylamine, n-hexylamine, allylamine, n-heptylamine, cyclopentylamine, ethylenediamine, diethylamino propyl amine, trimethylenediamine, tetramethylenediamine, pentamethylenediamine, hexamethylenediamine, ethanolamine, diethanolamine, meta-xylylenediamine, aniline, methylaniline, β-phenylethylamine, diphenylethylamine, p,p-diaminodiphenyl sulfone, methylenedianiline, p,p-diaminodiphenylmethane, o-aminoacetanilide, o-toluidine, m-toluidine, p-toluidine, o-phenylenediamine, m-phenylenediamine, p-phenylenediamine, diethylenetriamine, o-anisidine, p-anisidine, p-phenetidine, o-chloroaniline, m-chloroaniline, p-chloroaniline, p-bromoaniline, 2,4,6-trichloroaniline, 2,4,6-tribromoaniline, diphenylamine, benzidine, hydrazine. Also the polyamines, illustrated by the amines having the general formula R"NHR'''(NHR')$_x$NH$_2$ wherein R' is a divalent alkylene radical having the formula —C$_c$H$_{2c}$— wherein $c$ is an integer from 2 to 6 and R''' is an alkylene radical as defined for R' or an arylene radical containing from 6 to 8 carbon atoms such as phenylene (—C$_6$H$_4$—), methylphenylene (—C$_6$H$_3$·CH$_3$—), dimethyl phenylene (—C$_6$H$_2$—(CH$_3$)$_2$—)

xylylene (—CH$_2$C$_6$H$_4$—CH$_2$—) and the like, R" is a monovalent radical selected from the group consisting of hydroxyalkyl and phenyl substituted hydroxyalkyl, $x$ is an integer from zero to three and with the provisos that when R" represents phenyl substituted hydroxyalkyl then R''' represents alkylene radical, and that when R''' represents an arylene radical, then R" represents hydroxyalkyl and $x$ is zero. Specific hydroxylated polyamines included in the above formula are:

N-(2-phenyl-2-hydroxyethyl)diethylenetriamine,
N-(2-phenyl-2-hydroxyethyl) 1,2-diaminopropane, N-(2-phenyl-2-hydroxyethyl) dipropylenetriamine,
N-hydroxyethyl-m-xylylenediamine,
N-hydroxyethyl-m-phenylenediamine,
N-hydroxypropyl-m-phenylenediamine, and
N-hydroxypropyl-2,5-tolylenediamine.

Other suitable amines are those having the general formula:

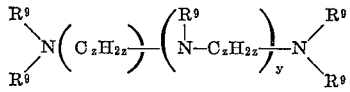

wherein $y$ is an integer having a value of 0 to 3 inclusive, $z$ is an integer having a value of 2 to 6 inclusive, each $R^9$ which can be the same or different, are hydrogen or hydroxyalkyl with the number of instances wherein $R^9$ is hydroxyalkyl being at least one but a whole number which is less than $y+2$. Among such amines can be noted N-hydroxyethylethylenediamine, N-hydroxyethyldiethylenetriamine and the like.

Among suitable phenols are the polyhydric phenols such as catechol, hydroquinone, hydroxyhydroquinone, phloroglucinol, resorcinol and pyrogallol; the di- or polynuclear phenols such as the bisphenols described in the Bender et al., United States Patent No. 2,506,486 and polyphenylols such as the novolak condensation product of a phenol and a saturated or unsaturated aldehyde containing an average of from 3 to 20 or more phenylol groups per molecule (cf. book by T. S. Carswell entitled Phenoplasts, published in 1947 by Interscience Publishers of New York). Examples of suitable polyphenylols derived from a phenol and an unsaturated aldehyde such as acrolein, are the triphenylols, pentaphenylols and heptaphenylols described in application Serial No. 368,-514, filed July 16, 1953, now United States Patent No. 2,885,385, and application Serial No. 422,275, filed April 9, 1954, by A. G. Farnham now United States Patent No. 2,801,989.

The phenols may contain alkyl, alkoxy, or halogen aryl ring substituents, as exemplified by the alkyl resorcinols, the tribromo resorcinol and the diphenols containing alkyl and halogen substituents on the aromatic ring (Bender et al., United States Patent 2,506,486).

Illustrative of suitable dihydric polynuclear phenols are the dihydric polynuclear phenols having the general formula:

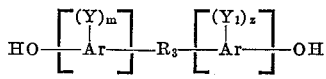

wherein: Ar is an aromatic divalent hydrocarbon radical such as naphthylene and phenylene with phenylene being preferred for purposes of this invention; Y and $Y_1$, which can be the same or different are alkyl radicals such as methyl, n-propyl, n-butyl, n-hexyl, n-octyl and the like, preferably alkyl radicals having a maximum of 4 carbon atoms; or halogen atoms, i.e., chlorine, bromine, iodine, or fluorine; or alkoxy radicals such as methoxy, methoxymethyl, ethoxy, ethoxyethyl, n-butoxy, amyloxy and the like, preferably an alkoxy radical having a maximum of 4 carbon atoms. It is to be understood that whenever there are substituents exclusive of the hydroxyl groups on either or both of the aromatic divalent hydrocarbon groups, that these substituents can be the same or different; $m$ and $z$ are integers having a value of from 0 to a maximum value corresponding to the number of hydrogen atoms on the aromatic ring (Ar) which can be replaced by substitutents and can have the same or different values; and $R_3$ is a divalent radical, as for example

or —O—, or —S—, or —SO—, or —SO$_2$—, or —S—S—, or a divalent hydrocarbon radical as, for example, an alkylene radical such as methylene, ethylene, trimethylene, tetramethylene, pentamethylene, hexamethylene, 2-ethyl hexamethylene, octamethylene, nonamethylene, decamethylene, and the like; an alkylidene radical such as ethylidene, propylidene, isopropylidene, isobutylidene, amylidene, isoamylidene, 1-phenyl ethylidene and the like, or a cycloaliphatic radical, such as 1,4-cyclohexylene, 1,3-cyclohexylene, cyclohexylidene, and the like, or halogenated alkylidene, alkylene or cycloaliphatic radicals, alkoxy and aryloxy substituted alkylidene, alkylene or cycloaliphatic radicals, such as methoxy methylene, ethoxy methylene, ethoxy ethylene, 2-ethoxy trimethylene, 3-ethoxy pentamethylene, 1,4 - (2 - methoxycyclohexane), phenoxy ethylene, 2-phenoxy trimethylene, 1,3-(2-phenoxy cyclohexane), and the like, aralkylene radicals, such as phenyl ethylene, 2-phenyl trimethylene, 1-phenyl pentamethylene, 2-phenyl decamethylene, and the like, aromatic radicals, such as phenylene, naphthylene, and the like, halogenated aromatic radicals, such as 1,4-(2-chlorophenylene), 1,4 - (2 - bromophenylene), 1,4 - (2-fluorophenylene), and the like; alkoxy and aryloxy substituted aromatic radicals, such as 1,4-(2-methoxyphenylene), 1,4-(2-ethoxyphenylene), 1,4-(2-n-propoxyphenylene), 1,4-(2-phenoxyphenylene), and the like, alkyl substituted aromatic radicals, such as 1,4-(2-methyphenylene), 1,4-(2-ethylphenylene), 1,4-(2 - n - propylphenylene), 1,4-(2-n-butylphenylene), 1,4-(2-n-dodecylphenylene) and the like.

The polyhydric phenols, as stated, can consist of 2 or more phenols connected by such groups as methylene, alkylene, ether, ketone or sulfone. The connecting groups are further exemplified by the following compounds: bis(p-hydroxyphenyl)ether, bis(p-hydroxyphenyl)ketone, bis(p-hydroxyphenyl)methane, bis(p - hydroxyphenyl)dimethyl methane, bis(p-hydroxyphenyl)sulfone and the like.

Among suitable mercaptans for purposes of this invention are those having the formula:

$$R_2SH$$

wherein $R_2$ is an amino, mercapto, or hydroxyl substituted alkyl, aryl, alkaryl or aralkyl radical. Illustrative of specific mercaptans falling within this formula are: 4-amino-o-thiocresol and its meta and para isomers, 4-amino-1-thionaphthol, 8-amino-2-thionaphthol, o-, m- and p - amino thiophenol, 2 - mercaptobenziminazol, 5 - amino - 2 - benzimidazolethiol, ethylene dithioglycol, $\beta$-mercaptoethanol, 2-mercaptoethylamine, 5-mercapto-2-naphthol, 2 - mercaptopropylamine, 3 - mercaptopropylamine, thiocatechol, thioresorcinol, thiohydroquinone, and the like, wherein $R_2$ as defined above contains a maximum of 20 carbon atoms.

It is to be understood that mixtures of 6-hydroxytetrahydropyran-2-carboxylic acid lactones and/or the polyfunctional compounds can be reacted if so desired.

In reacting a 6-hydroxytetrahydropyran-2-carboxylic acid lactone with polyfunctional organic compounds containing at least two reactive hydrogen atoms per molecule, various amounts of the reactants can be employed. Generally, the amount of a 6-hydroxytetrahydropyran-2-carboxylic acid lactone used will vary from about 0.1 mole to about 2 moles, and higher if so desired, per each reactive hydrogen equivalent of the polyfunctional organic compound. The actual amounts of reactants used will be dictated by the ultimate properties desired in the polymer produced. For example, in those instances wherein it is desired that the polymer be used as a protective coating which offers maximum resistance to attack by organic chemicals, it is preferred to use about one mole of lactone per reactive hydrogen atom equivalent of the polyfunctional organic compound.

It is preferred to prepare the thermosetting polymers in an inert, liquid diluent. The use of a diluent insures that the reactants will be brought into intimate contact and will therefore have a better opportunity to react completely. Preferably, the inert, liquid diluent used is one which is a solvent for the starting materials and for the polymer which is produced. Utilizing a diluent in which the polymer is soluble provides a polymer solution which can be applied directly onto a surface which is to be coated. Examples of suitable inert liquid diluents are: water, organic diluents such as organic ethers, illustrative of which are diethyl ether, diphenyl ether, ethyl propyl ether, amyl phenyl ether, dioxane, furan and the like, ketones such as acetone, methyl ethyl ketone, methyl isobutyl ketone, and the like, hydrocarbons such as benzene, toluene, xylene, heptane, nonane and the like. Mixtures of suitable inert liquid diluents can be used, if so desired. The liquid diluent can be removed by evaporation either before the polymer is thermoset or during the thermosetting of the polymer.

The amount of liquid diluent employed is not critical. Sufficient diluent is used to provide a reaction medium in which the reactants are brought into intimate contact. Since dilution has no effect on the polymer produced, rather large amounts of diluent can be used. As a rule the amount of diluent used is such that the total monomer content is less than about 85 percent by weight, based on the total weight of the reaction mixture.

The reaction between a lactone and a polyfunctional organic compound is generally conducted at temperatures on the order of about 0° C. to about 100° C. and preferably from about 20° C. to about 60° C., in order to completely solubilize the reactants and the thermosetting polymer.

Usually, the reaction between a 6-hydroxytetrahydropyran-2-carboxylic acid lactone and a polyfunctional organic compound to produce a thermosetting polymer will

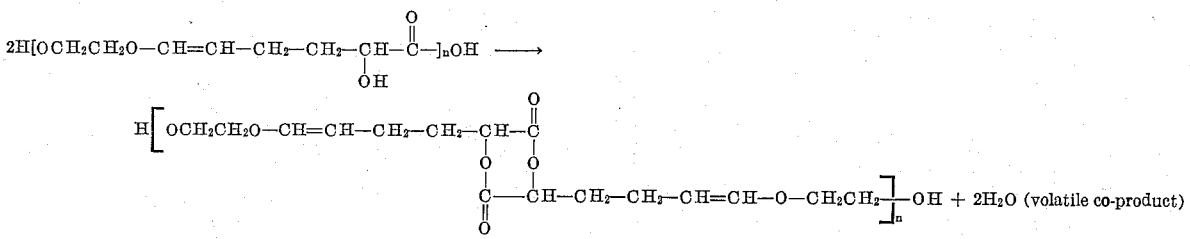

take from about 10 to about 60 minutes. Completion of the reaction is evidenced by an increase in the viscosity of the solution.

If it is desired to recover the thermosetting polymers before they are thermoset, they can be precipitated from solution by addition thereto of a liquid which is a nonsolvent for the polymer. Also, the thermosetting polymer can be recovered as a precipitate by carrying out the reaction between the 6-hydroxytetrahydropyran-2-carboxylic acid lactone and the polyfunctional organic compound in a liquid diluent that is a solvent for the reactants but is a non-solvent for the polymer.

The exact nature of the reactions which result in the formation of the thermosetting polymers and the thermoset products thereof are of not known. While not wishing to be bound by any particular theory, it is possible to postulate as to the reactions that occur. For example, using 6-hydroxytetrahydropyran-2-carboxylic acid lactone and ethylene glycol as reactants, the following reactions are postulated:

A. OPENING OF THE LACTONE RING

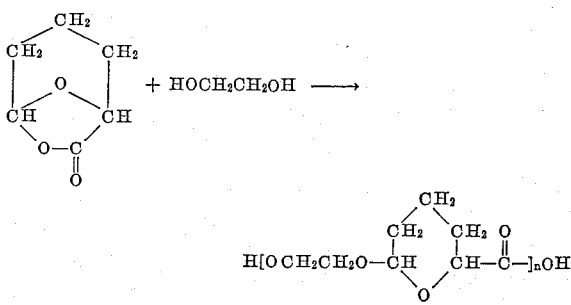

B. OPENING OF THE PYRAN RING ACCORDING TO B-1 AND/OR B-2

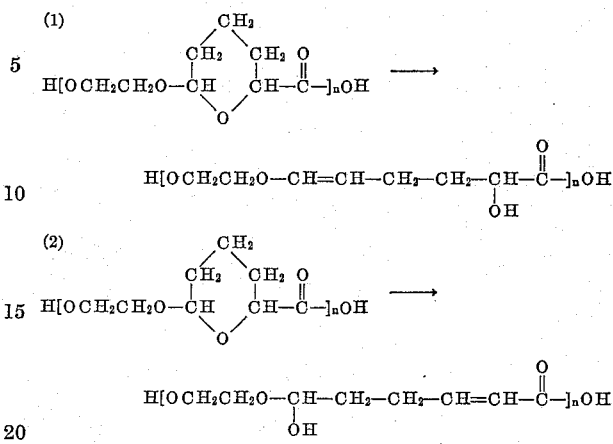

After the opening of the lactone and pyran rings as postulated above, the formation of the cured polymer is thought to occur by esterification. This is indicated by the formation of bubbles (voids) in the polymer as it is being cured in sections at least 10 mils thick. The only tenable explanation of this observed fact lies in the formation of a volatile by-product with the volatile product being trapped in the increasingly viscous resin. In order to account for the formation of this volatile by-product ester formation might occur as follows using for convenience the product of B-1.

Infra-red spectrum analysis of thermoset product shows the presence of ester-type carbonyl groups and carbon to carbon double bonds. This is significant because the presence of carbon to carbon unsaturation supports the theory that opening of the pyran ring occurs, and with this established, the other postulated reaction can logically follow.

The polymers of this invention are thermoset to infusible, water-insoluble products by heating at temperatures on the order of 75° C. to about 200° C. The exact conditions in each case will depend, in part, upon the particular polymer which is being thermoset.

The following examples illustrate this invention and are not intended to limit the scope thereof in any manner.

*Example 1*

To a beaker containing 3 grams of dioxane and 1.71 grams (0.0128 mole) of 1,2,6-hexanetriol, there was added 3.56 grams (0.0278 mole) of 6-hydroxytetrahydropyran-2-carboxylic acid lactone and the mixture was stirred until a homogeneous solution was obtained. A portion of the solution was spread onto a glass plate to a uniform thickness of about 2 mils. The plate was then placed into a circulating air oven and cured by heating for 3 hours at 125° C. The resultant thermoset product was hard glossy and free of tack. It was unaffected by contact with methanol, xylene, isopropyl ether and ethylene glycol monobutyl ether.

Another portion of the initial solution was used to demonstrate the adhesive properties of the polymer. The solution was coated onto one surface of each of two pieces of ⅜ inch plywood. The two pieces were clamped together with the coated surfaces in contact and this "sandwich" was placed into an oven for 2¾ hours at 100° C. After cooling the "sandwich" was broken apart with the result that failure occurred by splintering of the wood thru the old glued joints rather than the new joints.

Example 2

To a petri dish containing 20 grams of water there was added 7.68 grams (0.06 mole) of 6-hydroxytetrahydropyran-2-carboxylic acid lactone and 2.68 grams (0.02 mole) of 1,2,6-hexanetriol, and the mixture was stirred until a homogeneous solution was obtained. The water was evaporated and the residual film in the petri dish was cured by heating to 150° C. for 3 hours. The thermoset product was clear and glossy.

Example 3

To a petri dish containing 20 grams of water there was added 5.12 grams (0.04 mole) of 6-hydroxytetrahydropyran-2-carboxylic acid lactone together with 1.24 grams (0.02 mole) of ethylene glycol and the mixture was stirred until a homogeneous solution was obtained. The water was evaporated and the residual film was cured by heating in a circulating air oven for 7.5 hours at 150° C. The thermoset product was clear, glossy and uniform.

Example 4

To a petri dish containing 20 grams of water there was added 5.12 grams (0.04 mole) of 6-hydroxytetrahydropyran-2-carboxylic acid lactone and 2.08 grams (0.02 mole) of 1,5-pentanediol and the mixture was stirred until a homogeneous solution was obtained. After evaporating the water, the petri dish containing residual film was placed in a circulating air oven and heated for 6 hours at 150° C. The thermoset product was clear, glossy and uniform.

Example 5

To a petri dish containing 20 grams of water there was added 5.12 grams (0.04 mole) of 6-hydroxytetrahydropyran-2-carboxylic acid lactone and 8 grams (0.02 mole) of poly(ethylene glycol) having an average molecular weight of about 400 and the mixture was stirred until a homogeneous solution was obtained. The water was evaporated and the residual film was cured by heating in a circulating air oven for 24 hours at 150° C.

Example 6

To a petri dish containing 10 grams of water there was added 1.54 grams (0.012 mole) of 6-hydroxytetrahydropyran-2-carboxylic acid lactone and 0.368 gram (0.04 mole) of glycerol and the mixture was stirred until a homogeneous solution was obtained. After the water was evaporated the residual film was placed in a circulating air oven and heated for 1 hour at 175° C. The thermostat product was hard, glossy and free of tack. It was unaffected by contact with methyl ethyl ketone.

Example 7

To a petri dish containing 10 grams of water there was added 2.05 grams (0.016 mole) of 6-hydroxytetrahydropyran-2-carboxylic acid lactone and 0.544 gram (0.004 mole) of pentaerythritol and the mixture was stirred until a homogeneous solution was obtained. The water was evaporated and the residual film was cured by heating in a circulating air oven for 8 hours at 150° C. The thermoset product was hard, glossy and free of tack. It was unaffected by contact with dioxane, methyl ethyl ketone, water and dimethyl formamide.

Example 8

The procedure of Example 7 was repeated using 1.008 grams (0.008 mole) of 6-hydroxytetrahydropyran-2-carboxylic acid lactone instead of 2.05 grams. The thermoset product exhibited the same properties as that of Example 7.

Example 9

To a petri dish containing 10 grams of dioxane there was added 5.1 grams (0.04 mole) of 6-hydroxytetrahydropyran-2-carboxylic acid lactone and 2.6 grams (0.02 mole) of 2,2-dimethyl-5-aminopentanol and the mixture was stirred until a homogeneous solution was obtained. A portion of the solution was cast on a glass plate to a uniform thickness of about 3 mils. The plate was then placed in a circulating air oven and heated for 1 hour at 100° C. The thermoset product was hard, glossy and free of tack.

Example 10

To a petri dish containing 10 grams of water there was added 1.54 grams (0.012 mole) of 6-hydroxytetrahydropyran-2-carboxylic acid lactone and 0.42 gram (0.004 mole) of diethanolamine and the mixture was stirred until a homogeneous solution was obtained. The water was evaporated and the residual film was cured by heating in a circulating air oven for 8 hours at 150° C. The thermoset product was hard, glossy and free of tack. It was unaffected by contact with dioxane, methyl ethyl ketone, dimethyl formamide and water.

Example 11

To a petri dish containing 10 grams of water there was added 1.54 grams (0.012 mole) of 6-hydroxytetrahydropyran-2-carboxylic acid lactone and 0.596 gram (0.004 mole) of triethanolamine and the mixture was stirred until a homogeneous solution was obtained. After the water was evaporated the residual film was placed in a circulating air oven and heated at 150° C. for 8 hours. The themoset product was hard, glossy and free of tack. It was unaffected by contact with dioxane, methyl ethyl ketone, dimethyl formamide and water.

Example 12

To a petri dish containing 5 grams of water there was added 1.28 grams (0.01 mole) of 6-hydroxytetrahydropyran-2-carboxylic acid lactone together with 0.267 gram (0.008 mole) of hydrazine and the mixture was stirred until a homogeneous solution was obtained. The water was evaporated and the residual film was cured by heating in a circulating air oven at 100° C. for 21 hours. The thermoset product was hard, glossy and free of tack. It was unaffected by contact with dioxane, methyl ethyl ketone and dimethyl formamide.

Example 13

To a petri dish containing 10 grams of water there was added 2.56 grams (0.02 mole) of 6-hydroxytetrahydropyran-2-carboxylic acid lactone and 0.30 gram (0.005 mole) of ethylenediamine and the mixture was stirred until a homogeneous solution was obtained. The water was evaporated and the residual film was cured by heating in a circulating air oven for 20 hours as 125° C. The thermoset product was hard, glossy and free of tack. It was unaffected by contact with dioxane, methyl ethyl ketone and dimethyl formamide.

Example 14

To a petri dish containing 10 grams of water there was added 2.56 grams (0.20 mole) of 6-hydroxytetrahydropyran-2-carboxylic acid lactone and 0.158 gram (0.005 mole) of hexamethylenediamine and the mixture was stirred until a homogeneous solution was obtained. After the water was evaporated the residual film was placed in a circulating air oven and heated at 125° C. for 20 hours. The thermoset product was hard, glossy and free of tack. It was unaffected by contact with dioxane and methyl ethyl ketone.

Example 15

To a petri dish containing 15 grams of water there was added 1.204 grams (0.008 mole) of 6-hydroxytetrahydropyran-2-carboxylic acid lactone and 0.41 gram (0.004 mole) of diethylenetriamine and the mixture was stirred until a homogeneous solution was obtained. The water was evaporated and the residual film was cured by heating in a circulating air oven for 20 hours at 125° C. The thermoset product was hard, glossy and free of tack.

It was unaffected by contact with dioxane and methyl ethyl ketone.

Example 16

To a petri dish containing 10 grams of water there was added 1.28 grams (0.01 mole) of 6-hydroxytetrahydropyran-2-carboxylic acid lactone and 0.73 gram (0.0067 mole) of p-aminophenol and the mixture was stirred until a homogeneous solution was obtained. The water was evaporated and the residual film was cured by heating in a circulating air oven for 8 hours at 125° C. The thermoset product was hard, glossy and free of tack. It was unaffected by contact with dioxane, dibutyl glycol ether and acetone.

Example 17

To a petri dish containing 10 grams of water there was added 1.28 grams (0.01 mole) of 6-hydroxytetrahydropyran-2-carboxylic acid lacton and 0.92 gram (0.0067 mole) of p-(2-hydroxyethyl)aniline and the mixture was stirred until a homogeneous solution was obtained. After evaporating the water, the residual film was cured by heating in a circulating air oven for 6.5 hours at 125° C. The thermoset product was hard, glossy and free of tack. It was unaffected by contact with dioxane, dibutyl glycol ether and acetone.

Example 18

A mixture of 1.36 grams (0.01 mole) of pentaerythritol and 4 grams (0.01 mole) of poly(ethylene glycol) having an average molecular weight of 400 was placed in a petri dish containing 2 grams of water and 7.68 grams (0.06 mole) of 6-hydroxytetrahydropyran-2-carboxylic acid lactone and the entire mixture was stirred until a homogeneous solution was obtained. A portion of the solution was cast onto a glass plate to a uniform thickness of 3 mils. The plate was then placed in a circulating air oven and heated for 4 hours at 150° C. The thermoset product was hard, glossy and free of tack.

Example 19

A mixture of 1.36 grams (0.01 mole) of pentaerythritol and 1.04 grams (0.01 mole) of 1,5-pentanediol was added to a petri dish containing 2 grams of water and 7.68 grams (0.06 mole) of 6-hydroxytetrahydropyran-2-carboxylic acid lactone and the entire mixture was stirred until a homogeneous solution was obtained. A portion of the solution was cast onto a glass plate to a uniform thickness of 3 mils. The plate was then placed in a circulating air oven and heated at 150° C. for 4 hours. The cured film was hard, glossy and free of tack.

Example 20

To a petri dish containing 10 grams of water there was added 1.28 (0.01 mole) grams of 6-hydroxytetrahydropyran-2-carboxylic acid lactone together with 0.84 gram (0.0067 mole) of o-amino mercaptobenzene and the mixture was stirred until a homogeneous solution was obtained. The water was evaporated and the residual film was cured by heating in a circulating air oven for 16 hours at 125° C. The thermoset product was hard, glossy and free of tack. It was unaffected by contact with dioxane, dibutyl glycol ether and acetone.

Example 21

To a petri dish containing 10 grams of water there was added 1.28 grams (0.01 mole) of 6-hydroxytetrahydropyran-2-carboxylic acid lactone together with 1.62 grams of water-soluble starch and the mixture was stirred until a homogeneous solution was obtained. The water was evaporated and the residual film was cured by heating in a circulating air oven for 16 hours at 125° C. The thermoset product was hard, translucent and free of tack. It was unaffected by contact with dioxane, methyl ethyl ketone and dimethylformamide.

Example 22

To a petri dish containing 10 grams of water there was added 1.28 grams (0.01 mole) of 6-hydroxytetrahydropyran-2-carboxylic acid lactone together with 2.18 grams of dextrose and the mixture was stirred until a homogeneous solution was obtained. The water was evaporated and the residual film in the dish was cured by heating in a circulating air oven for 16 hours at 100° C. The thermoset product was hard, glossy and free of tack.

Example 23

To a petri dish containing 0.4 gram of water there was added 1.87 grams (0.012 mole) of 2,5-dimethyl-6-hydroxytetrahydropyran-2-carboxylic acid lactone together with 0.42 gram (0.004 mole) of diethanolamine and the mixture was stirred until a homogeneous solution was obtained. The water was evaporated and the residual film was cured in a circulating air oven for 60 hours at 175° C. The thermoset product was hard, glossy and free of tack. It was unaffected by contact with dioxane, methyl ethyl ketone, water and dimethylformamide.

Example 24

To a petri dish containing 40 grams of water there was added 2.0 grams of 6-hydroxytetrahydropyran-2-carboxylic acid lactone together with 2 grams of hydroxyethyl cellulose and the mixture was stirred until a homogeneous solution was obtained. The water was evaporated and the residual film in the dish was cured by heating in a circulating air oven for 1 hour at 75° C. The thermoset product was hard, glossy and free of tack. In a similar manner a film was prepared from hydroxyethyl cellulose with the lactone omitted. The two films were examined for resistance to attack by water and for adhesion to glass. The film without the lactone was rapidly dissolved by water and also found to strip readily from glass. The "lactone" film, however, was only slowly attacked by water but was not dissolved and could not be stripped from the glass at all.

Example 25

Two grams of 6-hydroxytetrahydropyran-2-carboxylic acid lactone was placed in 40 grams of water together with 2 grams of polyvinyl alcohol having a viscosity, as a 4 percent aqueous solution at 28° C., of 28 to 32 centipoises, and the mixture was stirred until a homogeneous solution was obtained. A portion of the aqueous solution was placed in a petri dish. The water was evaporated and the residual film in the dish was cured by heating in a circulating air oven for 1 hour at 75° C. The thermoset product was hard, glossy and free of tack. In a similar manner a film was prepared from an aqueous solution of the polyvinyl alcohol with the lactone omitted. The two products were examined for resistance to attack by water and for adhesion to glass. The product without lactone was severely attacked by water and pulled away from the glass as it dried. By contrast, the product containing the lactone was only slightly swelled by water and could not be stripped from the glass.

It is to be understood that the disclosure of all literature references and patents noted in this application are incorporated herein by reference.

What is claimed is:

1. A thermosetting polymer, capable of curing to a thermoset product in the absence of a catalyst at a temperature of about 75° C. to about 200° C., which is the reaction product of a lactone having the formula:

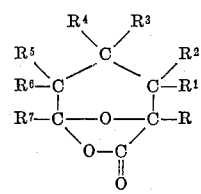

wherein R through R[7] are selected from the group consisting of hydrogen and alkyl containing from 1 to 8 carbon atoms inclusive and a polyfunctional organic compound containing at least two reactive hydrogen atoms per molecule and selected from the group consisting of alcohols, amines, phenols and mercaptans, formed on reacting at least about 0.1 mole of lactone per reactive hydrogen equivalent of said polyfunctional organic compound at a temperature of about 0° C. to about 100° C.

2. A thermosetting polymer as defined in claim 1 wherein R through R[7] are hydrogen.

3. A thermosetting polymer as defined in claim 1 wherein the said polyfunctional organic compound is an alcohol.

4. A thermosetting polymer as defined in claim 1 wherein the said polyfunctional organic compound is an amine.

5. A thermosetting polymer as defined in claim 1 wherein the said polyfunctional organic compound is a phenol.

6. A thermosetting polymer as defined in claim 1 wherein the said polyfunctional organic compound is a mercaptan.

7. A thermosetting polymer as defined in claim 2 wherein the said polyfunctional organic compound is 1,2,6-hexanetriol.

8. A thermosetting polymer as defined in claim 2 wherein the said polyfunctional organic compound is pentaerythritol.

9. A thermosetting polymer as defined in claim 2 wherein the said polyfunctional organic compound is ethylene glycol.

10. A thermosetting polymer as defined in claim 2 wherein the said polyfunctional organic compound is 1,5-pentanediol.

11. A thermosetting polymer as defined in claim 2 wherein the said polyfunctional organic compound is a poly(ethylene glycol).

12. A thermosetting polymer as defined in claim 2 wherein the said polyfunctional organic compound is glycerol.

13. A thermosetting polymer as defined in claim 2 wherein the said polyfunctional organic compound is a mixture of pentaerythritol and a poly(ethylene glycol).

14. A thermosetting polymer as defined in claim 2 wherein the said polyfunctional organic compound is a mixture of pentaerythritol and 1,5-pentanediol.

15. A method of producing a thermosetting polymer, capable of curing to a thermoset product in the absence of a catalyst at a temperature of about 75° C. to about 200° C., which comprises reacting in a liquid diluent at a temperature of about 0° C. to about 100° C. a lactone having the formula:

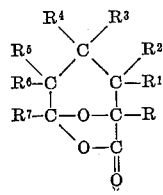

wherein R through R[7] are selected from the group consisting of hydrogen and alkyl containing from 1 to 8 carbon atoms inclusive, with a polyfunctional organic compound containing at least two reactive hydrogen atoms per molecule and selected from the group consisting of alcohols, amines, phenols and mercaptans, wherein the lactone is used in an amount of about 0.1 mole per reactive hydrogen equivalent of said polyfunctional organic compound.

16. A method as defined in claim 15 wherein said lactone is used in amounts of from about 0.1 to about 2 moles per reactive hydrogen equivalent of said polyfunctional organic compound.

17. A method as defined in claim 15 wherein said lactone is used in an amount of about 1 mole per reactive hydrogen equivalent of said polyfunctional organic compound.

18. A method of producing a thermosetting polymer which comprises reacting in a liquid diluent and at a temperature of about 20° C. to about 60° C., a polyfunctional organic compound containing at least two reactive hydrogen atoms per molecule and selected from the group consisting of alcohols, amines, phenols and mercaptans with at least about 0.1 mole, per reactive hydrogen equivalent of said polyfunctional organic compound, of a lactone having the formula:

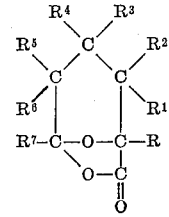

wherein R through R[7] are selected from the group consisting of hydrogen and alkyl containing from 1 to 4 carbon atoms inclusive.

19. The thermoset product of the polymer defined in claim 1.

20. The thermoset product of the polymer defined in claim 2.

References Cited by the Examiner

UNITED STATES PATENTS

| | | | |
|---|---|---|---|
| 2,455,731 | 12/1948 | Caldwell | 260—78.3 |
| 2,945,005 | 7/1960 | De Groote et al. | 260—47 |
| 3,052,692 | 9/1962 | Phillips et al. | 260—78.3 |

FOREIGN PATENTS 859,642  1/1961  Great Britain.

OTHER REFERENCES

Brezinski et al.: Journal of Organic Chemistry, vol. 24, pages 1807–1809, November 1959.

JOSEPH L. SCHOFER, *Primary Examiner.*

LEON J. BERCOVITZ, *Examiner.*

J. A. SEIDLECK, *Assistant Examiner.*